United States Patent [19]

Ratzabi

[11] Patent Number: 4,635,035
[45] Date of Patent: Jan. 6, 1987

[54] VEHICLE AUTOMATIC SWITCHING BURGLAR ALARM

[76] Inventor: Moshe Ratzabi, 1915 Avenue M, Brooklyn, N.Y. 11230

[21] Appl. No.: 591,489

[22] Filed: Mar. 20, 1984

[51] Int. Cl.[4] ............................................ B60R 25/00
[52] U.S. Cl. .................... 340/63; 340/542; 307/10 AT; 70/388; 200/61.66
[58] Field of Search .............. 340/63, 542; 200/61.44, 200/61.46, 61.39, 61.66, 61.64; 70/DIG. 49, 388, 237; 307/10 AT

[56] References Cited

U.S. PATENT DOCUMENTS

| | | | |
|---|---|---|---|
| 3,552,160 | 1/1971 | Kleebauer | 70/388 |
| 3,569,930 | 3/1971 | Hirama | 340/63 |
| 3,587,081 | 6/1971 | Hawkins et al. | 200/61.66 X |
| 3,797,004 | 3/1974 | Muessel et al. | 340/529 |
| 3,936,673 | 2/1976 | Kelly et al. | 307/10 AT |
| 4,383,242 | 5/1983 | Sassover et al. | 340/64 |

FOREIGN PATENT DOCUMENTS

| | | |
|---|---|---|
| 1438115 | 6/1976 | United Kingdom . |
| 1440943 | 6/1976 | United Kingdom . |
| 1440944 | 6/1976 | United Kingdom . |

Primary Examiner—Charles A. Ruehl
Assistant Examiner—Jeffery A. Hofsass
Attorney, Agent, or Firm—Howard F. Mandelbaum

[57] ABSTRACT

Apparatus for arming and disarming a vehicle alarm in response to locking and unlocking of an entranceway to the vehicle has a cylinder mounted in the housing and adapted to be rotated relative thereto by the turning of a key inserted therein in one direction for locking said entranceway and the opposite direction for unlocking said entranceway. A slidable member signals that the alarm has been armed. The alarm is armed and disarmed by the movement of a first cam fixedly mounted on one of the cylinder and the housing and a plurality of switches fixedly mounted on the other of the housing and the cylinder. The first cam engages one of the switches to arm the alarm when the cylinder is rotated to one position and engages another of the switches to disarm the alarm when the cylinder is rotated to another position. A second cam freely mounted in circumscribing relationship to the cylinder rotates upon the turning of said cylinder with an unauthorized key thereby actuating another switch to sound the alarm.

15 Claims, 4 Drawing Figures

VEHICLE AUTOMATIC SWITCHING BURGLAR ALARM

BACKGROUND OF THE INVENTION

Vehicle alarm systems are popular and exist in a wide variety of types. One of the important characteristics of an alarm system is the way in which it is operated.

A popular way of operating a vehicle alarm system is by using a key switch which is installed on the body of the car and is operated by the driver before leaving the vehicle and upon returning to it. This type of alarm avoids the need for an alarm unit with a delay circuit because it is armed and disarmed from outside the vehicle. Another manner of alarm operation is by way of a hidden switch inside the car. The advantage of this type of alarm is easy operation. However, it requires an alarm unit with delay circuits. Another type of alarm is operated by the ignition switch of the car. In this system, the alarm unit is armed upon turning the ignition switch off (or after removing the key from the ignition switch). The disadvantage of this system is that it requires that the key be inserted into the ignition switch every time the vehicle is entered to prevent sounding of the alarm.

SUMMARY OF THE INVENTION

The instant invention eliminates most of the disadvantages of prior art vehicle alarm systems as discussed above. This is accomplished without using complicated circuits and with high reliability. The apparatus of the invention is electromechanical and designed to work with the conventional lock system which is used in modern vehicles.

The locking mechanism used for arming and disarming the alarm, according to the present invention, employs the regular door lock which has the known use of locking and unlocking the door when leaving the vehicle or reentering it. However, the locking mechanism of the invention performs a function in addition to merely locking the door. It sets the alarm unit to "on" (armed) and "off" (disarmed) states, automatically, and it gives an indication of the state.

The present invention is specifically directed to apparatus for arming and disarming a vehicle alarm in response to locking and unlocking of an entranceway to the vehicle and for actuating the alarm in response to an unauthorized attempt to disarm the alarm, having a housing adapted to be mounted on the vehicle adjacent the entranceway, a cylinder mounted in the housing and adapted to be rotated relative thereto by the turning of a key inserted therein in one direction for locking the entranceway and the opposite direction for unlocking the entranceway, means for signalling that the alarm has been armed, means for arming and disarming the alarm including a cam fixedly mounted on one of the cylinder and the housing, at least two switches fixedly mounted on the other of the housing and the cylinder, the cam engaging one of the switches to arm the alarm when the cylinder is rotated to the locking position and engaging the other of the switches to disarm the alarm when the cylinder is rotated to the unlocking position, a second cam freely mounted in circumscribing relationship to the cylinder for permitting the cylinder to be rotated relative thereto upon insertion of an authorized key in a keyway 19 within the cylinder and for rotation with the cylinder when turned by an unauthorized key, and a switch mounted adjacent the second cam and engaged upon rotation of the second cam for actuating the alarm.

It is, therefore, an object of the invention to achieve automatic switching of the alarm unit between armed and disarmed states when a door is locked and unlocked, respectfully.

Another object of the invention is to provide an indication that the alarm circuit has been armed.

A further object of the invention is to provide means for actuating the alarm in response to an unauthorized attempt to disarm the alarm.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
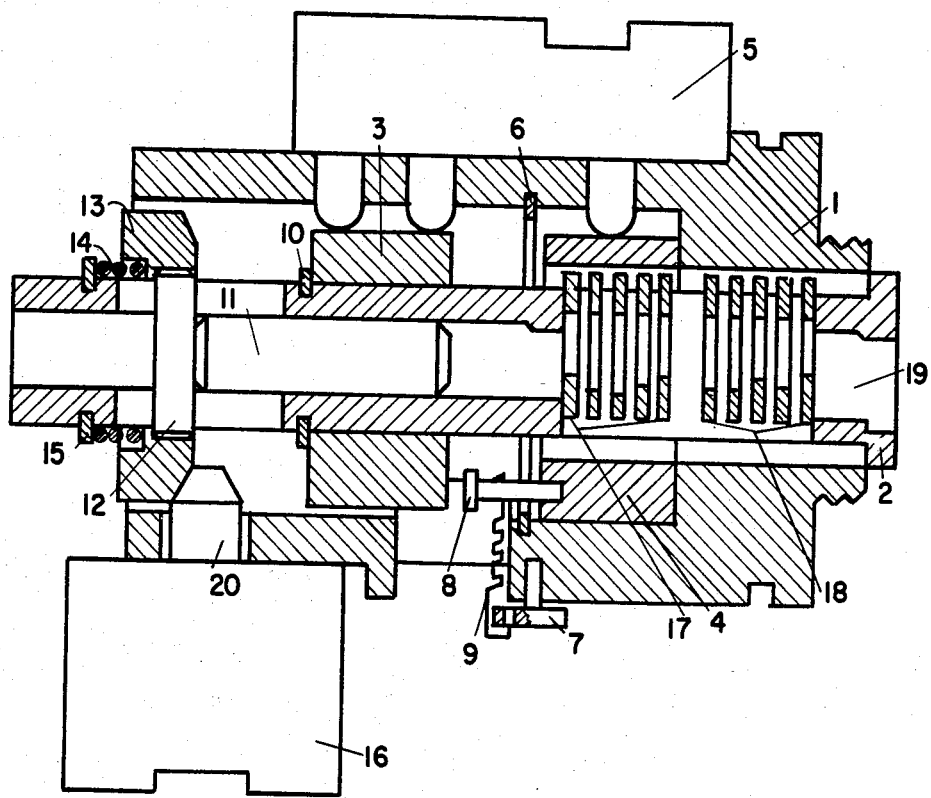
FIG. 1 is a sectioned side elevation view of the mechanism of the preferred embodiment of the invention.
Figure 2:
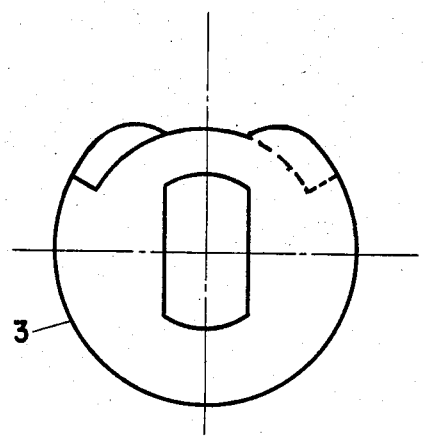
FIG. 2 is an end view of one of the components in the mechanism of FIG. 1.

Referring now to FIG. 1, The mechanism of the invention includes a hollow metal sleeve 1 which serves as a housing for the unit. Into the sleeve 1 there is fitted a locking cylinder 2 which can turn in either direction after insertion of the proper key therein. On the locking cylinder 2 there is force fitted a cam 3 more readily seen in in FIG. 2. The outside surface of the cam 3 is contoured to actuate a switch AS2 when it turns in one direction and to operate a switch AS3 when turned in the opposite direction. The cam 3 and the cylinder 2 always move together.

Figure 3:
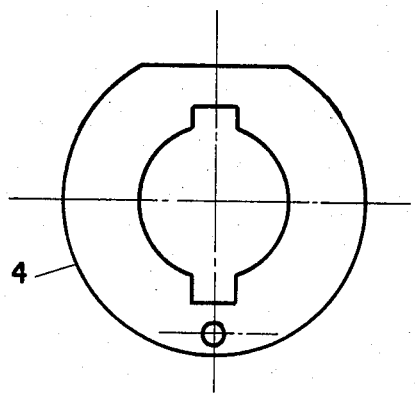
FIG. 3 is an end view of another of the components of the mechanism illustrated in FIG. 1.

A tampering detector including a cam 4, shown in detail in FIG. 3, is freely mounted about the cylinder 2 for relative rotation with respect thereto. A keyway 19 is provided within the cylinder 2 for receiving a key to turn the cylinder 2 for the conventional purpose of locking and unlocking an entranceway to the vehicle. Adjacent the keyway 19 are two sets of axially displaced tumblers 17 and 18. The cam 4 and tumblers 17 are mounted so that any torque applied to the tumblers 17 when they are not aligned by insertion and turning of an authorized key is imparted to the cam 4. The keyway 19 in the cylinder 2 is thus designed in such a way that any rotary motion of the cylinder 2 caused by a key having teeth which do not properly mesh with the tumblers 17 will cause rotation of the cam 4 and actuation of an adjacent switch AS1 which is mounted on the interior of the housing 1. The function and operation of the cam 4 and switch AS1 are described, more fully, below.

A switch housing 5 containing switches AS1, AS2 and AS3 is mounted on the outside surface of the housing 1 and as previously described, the switches AS1, AS2 and AS3 are actuated by the motion of the cams 3 and 4.

There is another assembly which gives an indication that the electric circuit has operated to arm an alarm unit AL. The alarm unit AL is conventional and not part of the invention which is directed to the arming and actuating system for the alarm unit AL. The locking cylinder 2 is hollow and inside it there is slidably disposed an ejector pin 11 the purpose of which is to eject the key from the locking cylinder 2. The ejector pin 11 is pushed by a vertical second pin 12 that is connected to a rejection ring 13 which is released in response to movement of the plunger 20 of a solenoid 16.

The electric switch 5, including the switches AS1, AS2, and AS3 and the electromagnet or solenoid 16 are connected to the alarm unit AL to operate it.

A spring washer 6 is received within a recess in the inner circumference of the sleeve 1 to restrict axial movement of the cam 4. An index pin 8 received within an aperture in the cam 4 is adapted to engage a spring 9 which is connected to an index pin 7 disposed in the outer circumference of the housing 1. As can be seen in FIG. 1, the pins 7 and 8, and spring 9 oppose rotation of the cam 4 relative to the housing 1 and urge the cam 4 toward a central neutral or steady state position.

As shown in FIG. 1, with the alarm disarmed, the solenoid 16 has its plunger 20 extended, thereby maintaining the rejection ring 13 against one end of a compressed coil spring 14, the other end of which is urged against a fixed spring washer 15. A safety spring washer 10 limits axial movement of the cam 3.

The operation of the system will now be described from the moment of leaving the vehicle by the driver up to the moment of his return.

As the driver leaves his vehicle he exits through the door and then puts the key into the locking cylinder 2 for the purpose of locking the door. When the key is fully inserted into the cylinder 2, the ejector pin 11 is urged inwardly against the vertical pin 12, thereby causing the snap ring 13 to be held by the plunger 20 of the solenoid 16 against the now compressed spring 14. The driver then turns the key in the locking direction. The locking cylinder 2 and the cam 3 turn with the key. After rotation of the key of about 45°, the rotary motion of the cam 3 actuates the switch AS2. The operation of switch AS2 causes relay A (see FIG. 4) to be latched into a closed state and to remain that way. When the normally open relay contacts of relay A are closed, the alarm unit AL is armed. At the same time, the switch AS2 causes the solenoid 16 to be operated so that the plunger 20 is retracted as explained below. When the key is returned back to the center position it can then be withdrawn, thereby permitting the snap ring 13 to be pushed outwardly, and the force is transferred by the vertical pin 12 to the central ejector pin 11 and the key is pushed out. The rejection of the key is an indication that the alarm unit AL is armed.

When the driver returns to his vehicle he puts the key into the locking cylinder 2 in order to unlock the door and turns the key in the unlocking direction. The rotary motion of the cylinder 2 with the cam 3 actuates the switch AS3. Switch AS3 applies voltage to the coil of relay B which when actuated causes relay A to open. The opening of relay A disarms the alarm unit AL.

In order to arm the alarm when a door is locked by the conventional locking button (not shown) on the door inside the vehicle, instead of by a key, a switch DLS is connected to the locking button. The switch DLS is momentarily closed when the button is placed in the locking position and the switch DD is closed when the car door is open. Under the foregoing conditions, a circuit from the coil of the relay A is completed to ground through diode D8 in a similar manner to when the switch AS2 is closed by turning the cylinder 2 with a key, except that a conventional exit time delay circuit (not shown) should be included in the alarm unit AL so that the door may be closed before the alarm is actuated.

When the alarm unit AL is armed it reacts like any other alarm system. The opening of any door of the car can turn it on as may other acts, depending on what type of alarm sensors the unit is connected to. Depending on the type of sensors used (which are not part of the invention) the unit could be turned on and the alarm sounded even if a theft is attempted without opening any car door. Diodes D1, D2, D3, D4, D5, D6, D7 and D8 direct the flow of current as will be understood by those skilled in the art.

The invention precludes the possibility of disarming the alarm unit AL by insertion of an imperfect key into the the keyway 19 in the cylinder 2. The insertion and turning of a key in which there are sufficient teeth cut to properly mesh in the keyway 19 with the tumblers 18 but not with the tumblers 17, and turn the cylinder 2 to unlock the door will cause relative rotation between the cam 4 and the switch AS1. This is due to the fact that the cam 4 circumscribes but is mounted free of the cylinder and will not rotate with the cylinder when an authorized key is used to turn it. However, a key which meshes properly with one group of tumblers 18, sufficiently to turn the cylinder 2 and unlock the door but not with the other group of tumblers 17 will cause the tumblers 17 to fail to align properly and, hence, to engage the the cam 4 and rotate it as the cylinder 2 is turned thereby actuating the switch AS1 which results in sounding of the alarm. The closing of switch AS1 enables current to flow to ground from the alarm unit AL through diode D4.

The electronic process that has been specified in the above explanation is caused by the operation of the integrated switch 5 which includes the switches AS1, AS2, and AS3. The electronic assembly is housed in three separate physical units in the preferred embodiment of the invention. The first unit Y includes the integrated switch 5 with switches AS1, AS2, and AS3, and the solenoid 16 which are mounted on the housing 1. The second unit X is an automatic switching box which contains the two relays A and B as well as the transistorized circuit shown in FIG. 4. The third unit is the separately mounted electronic alarm unit AL which is connected to respond to the output of the automatic switching box X.

The operation of switch AS2 turns on relay A which receives a negative voltage through a diode D2. The relay A is connected in a latching circuit. The normally open integrated contacts SWA1 and SWA2 of the relay A close thereby arming the alarm unit AL. At the same time, the closed switch AS2 causes the discharge of the capacitor C1 through diode D1 to the negative ground, thereby causing the transistorized circuit including transistors TR1 and TR2, and resistors R1, R2, R3 and R4 to actuate the solenoid 16, i.e., retract the plunger 20. The actuation of switch AS3 the energizes relay B causing its normally closed integrated contacts SWB1 to open thereby cutting off the voltage applied to relay A and turning off the alarm unit AL.

The operation of switch AS1 actuates the alarm unit AL and sounds the alarm by supplying negative voltage to the alarm unit AL through the start line SL via diode D4.

The driver door switch DD closes a circuit when the driver door is opened and it supplies negative voltage to the start line SL of the alarm unit AL through diode D3 thereby causing immediate sounding of the alarm.

Figure 4:
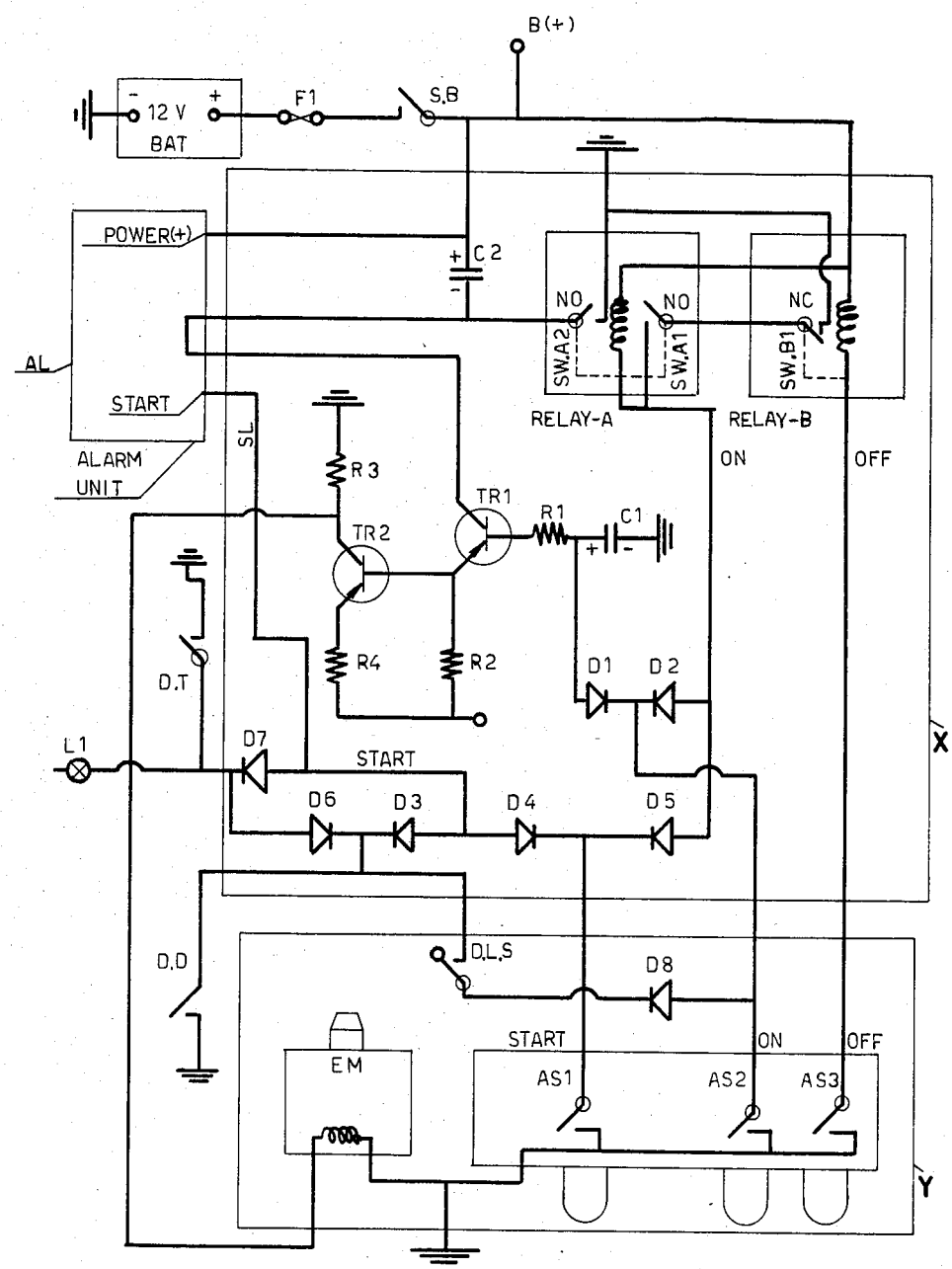
FIG. 4 is an electrical schematic of the circuit of the apparatus of the invention.

The other door switches are connected in the manner of switch DT shown in FIG. 4. When a door switch DT is actuated, it supplies negative voltage to the start line SL of the alarm unit AL, again immediately sounding the alarm.

The switching box X is connected to the automobile's battery or other power source through main switch SB and fuse F1. The power to the alarm unit AL is supplied from the same line. In case of any failure or uncontrolled operation, the power can be cut off manually by opening the main switch SB. The system will normally work in any case of attempted theft, or if the vehicle is entered in an unusual way (by the driver), e.g., getting in from a rear door which was inadvertently left unlocked.

It is to be appreciated that the foregoing is a description of a preferred embodiment of the invention to which alterations, variations and modifications can be made without departing from the spirit and scope of the invention which is set forth in the following claims. For example, the invention can be used to control an alarm in an environment other than a motor vehicle.

What is claimed is:

1. Apparatus for arming and disarming a vehicle alarm in response to locking and unlocking of an entranceway to the vehicle comprising:
   a housing adapted to be mounted on said vehicle adjacent said entranceway;
   locking and unlocking means including a cylinder mounted in said housing and adapted to be rotated relative thereto by the turning of a key inserted therein in one direction for locking said entranceway and the opposite direction for unlocking said entranceway;
   sensing means responsive to said locking and unlocking means for sensing the locking and unlocking of said entranceway; and
   remote switch means responsive to said sensing means and having a first switch state for arming said alarm in response to the locking of said entranceway and a second switch state for disarming said alarm in response to the unlocking of said entranceway and means responsive to said sensing means for providing a tactile indication that said alarm has been armed.

2. Apparatus for arming and disarming a vehicle alarm according to claim 1 wherein said arming and disarming means comprises frist cam means fixedly mounted on one of said cylinder and said housing and a switch fixedly mounted on the other of said housing and said cylinder, said first cam means engaging said switch to actuate it when the cylinder is rotated to one position and disengaging said switch to deactuate it when said cylinder is rotated to another position.

3. Apparatus for arming and disarming a vehicle alarm in response to locking and unlocking of an entranceway to the vehicle comprising:
   a housing adapted to be mounted on said vehicle adjacnet said entranceway;
   a cylinder mounted in said housing and adapted to be rotated relative thereto by the turning of a key inserted therein in one direction for locking said entranceway and the opposite direction for unlocking said entranceway;
   means for arming said alarm in response to the locking of said entranceway and for disarming said alarm in response to the unlocking of said entranceway; and
   means for signaling that said alarm has been armed wherein said signalling means comprises a member movably mounted with respect to said cylinder for motion between a first position at which it freely permits insertion of said key in said cylinder and a second position in the path of said key within said cylinder.

4. Apparatus for arming and disarming a vehicle alarm according to claim 3 wherein said movable member is slidably mounted within a bore in said cylinder and further comprising means responsive to said arming and disarming means for urging said member to said second position when said alarm is armed.

5. Apparatus for arming and disarming a vehicle alarm according to claim 4 wherein said urging means comprises a spring normally biased to force said movable member toward said second position and a solenoid having a plunger actuable between two states, said plunger permitting said spring to urge said member toward said second position in one of said soleniod states and preventing said spring from urging said member toward said second position in the other of said states whereby said key may be freely inserted into said cylinder.

6. Apparatus for arming and disarming a vehicle alarm in response to locking and unlocking of an entranceway to the vehicle comprising:
   a housing adapted to be mounted on said vehicle adjacent said entranceway;
   locking and unlocking means including a cylinder mounted in said housing and adapted to be rotated relative thereto by the turning of a key inserted therein in one direction for locking said entranceway and the opposite direction for unlocking said entranceway;
   sensing means responsive to said locking and unlocking means for sensing the locking and unlocking of said entranceway;
   means responsive to said sensing means for automatically providing a tactile indication that said alarm has been armed in response to the locking of said entranceway; and
   cam means fixedly mounted on one of said cylinder and said housing, said sensing means comprising a plurality of switches fixedly mounted on the other of said housing and said cylinder, said cam means engaging at least one of said switches to arm the alarm when the cylinder is rotated in said locking direction and engaging another of said switches to disarm said alarm when said cylinder is rotated in said unlocking direction.

7. Apparatus for arming and disarming a vehicle alarm in response to locking and unlocking of an entranceway to the vehicle comprising:
   a housing adapted to be mounted on said vehicle adjacent said entranceway;
   a cylinder mounted in said housing and adapted to be rotated relative thereto by the turning of a key inserted therein in one direction for locking said entranceway and the opposite direction for unlocking said entranceway;
   means for signaling that said alarm has been armed;
   means for arming and disarming said alarm including a cam fixedly mounted on one of said cylinder and said housing and a plurality of switches fixedly mounted on the other of said housing and said cylinder, said cam engaging at least one of said switches to arm the alarm when the cylinder is rotated in said locking direction and engaging another of said switches to disarm said alarm when said cylinder is rotated in said unlocking direction, a member movably mounted with respect to said cylinder for motion between a first position which permits insertion of said key in said cylinder and a second position in the path of said key within said cylinder and a solenoid responsive to one of said switches for permitting said member to move from said first position to said second position when the cylinder is turned in said locking direction.

8. Apparatus for arming and disarming a vehicle alarm in response to locking and unlocking of an entranceway to the vehicle with a key comprising:

a housing adapted to be mounted on said vehicle adjacent said entranceway;

locking and unlocking means including a cylinder mounted in said housing and having a keyway adapted to receive a key conforming thereto, said cylinder being rotatable relative to said housing by the turning of said key inserted in said keyway in one direction for locking said entranceway and the opposite direction for unlocking said entranceway;

sensing means responsive to said locking and unlocking means for sensing the locking and unlocking of said entranceway;

means responsive to said sensing means for arming said alarm in response to rotation of said cylinder in said one direction and for disarming said alarm in response to rotation of said cylinder in said other direction; and means for actuating said alarm in response to rotation of said cylinder by a key which does not fully conform to said keyway, inserted therein.

9. Apparatus for arming and disarming a vehicle alarm according to claim 8 further comprising means for signalling that said alarm has been armed.

10. Apparatus for arming and disarming a vehicle alarm in response to locking and unlocking of an entranceway to the vehicle with a key comprising:

a housing adapted to be mounted on said vehicle adjacent said entranceway;

a cylinder mounted in said housing and having a keyway adapted to receive a key conforming thereto, said cylinder being rotatable relative to said housing by the turning of said key inserted in said keyway in one direction for locking said entranceway and the opposite direction for unlocking said entranceway;

means for arming said alarm in response to rotation of said cylinder in said one direction and for disarming said alarm in response to rotation of said cylinder in said other direction; and means for actuating said alarm in response to rotation of said cylinder by a key which does not fully conform to said keyway, inserted therein, wherein said actuating means comprises cam means freely mounted in circumscribing relationship to said cylinder adjacent a portion of said keyway, said cam means having a neutral position and an alarm actuating position;

means for urging said cam means toward said neutral position;

means for engaging said cam means for rotation to said alarm actuating position upon rotation of said cylinder by a key which does not conform to said keyway; and alarm actuating switch means mounted for engagement by said cam means only when in said alarm actuating position.

11. Apparatus for arming and disarming a vehicle alarm according to claim 10 wherein said urging means includes a leaf spring having one end connected to said second cam means and another end connected to said housing.

12. Apparatus for arming and disarming a vehicle alarm in response to locking and unlocking of an entranceway to the vehicle with a key comprising:

a housing adapted to be mounted on said vehicle adjacent said entranceway;

a cylinder mounted in said housing and having a keyway adapted to receive a key conforming thereto, said cylinder being rotatable relative to said housing by the turning of said key inserted in said keyway in one direction for locking said entranceway and the opposite direction for unlocking said entranceway;

means for arming said alarm in response to rotation of said cylinder in said one direction and for disarming said alarm in response to rotation of said cylinder in said other direction;

means for actuating said alarm in response to rotation of said cylinder by a key which does not fully conform to said keyway, inserted therein, and means for signalling that said alarm has been armed, wherein said signalling means comprises a member movably mounted with respect to said cylinder for motion between a first position which permits insertion of said key in said cylinder and a second position in the path of said key within said cylinder.

13. Apparatus for arming and disarming a vehicle alarm according to claim 12 wherein said movable member is slidably mounted within said cylinder and further comprising means responsive to said arming and disarming means for urging said member to said second position when said alarm is armed.

14. Apparatus for arming and disarming a vehicle alarm according to claim 13 wherein said urging means comprises a spring normally biased to force said member toward said second position and a solenoid having a plunger actuable between two states, said plunger permitting said spring to urge said member toward said second position in one of said solenoid states and preventing said spring from urging said member toward said second position in the other of said states whereby said key may be freely inserted into said cylinder.

15. Apparatus according to claim 1 wherein said locking and unlocking means comprises door locking button means and said sensing means comprises switch means operatively connected to said button means.

* * * * *